United States Patent
He et al.

(10) Patent No.: US 9,522,708 B2
(45) Date of Patent: Dec. 20, 2016

(54) DEFORMABLE TRACK SUPPORT FOR TRACKED VEHICLES

(76) Inventors: Zhengxu He, Reno, NV (US); Xinlu Tang, Cupertino, CA (US); Xianxiang Chen, Changsha (CN)

(*) Notice: Subject to any disclaimer, the term of this patent is extended or adjusted under 35 U.S.C. 154(b) by 1029 days.

(21) Appl. No.: 13/567,008

(22) Filed: Aug. 3, 2012

(65) Prior Publication Data

US 2014/0035355 A1 Feb. 6, 2014

(51) Int. Cl.
- B62D 55/10 (2006.01)
- B62D 55/075 (2006.01)
- B62D 55/30 (2006.01)
- B62D 55/24 (2006.01)

(52) U.S. Cl.
CPC ............ B62D 55/075 (2013.01); B62D 55/24 (2013.01); B62D 55/30 (2013.01)

(58) Field of Classification Search
CPC ..... B62D 55/00; B62D 55/108; B62D 55/075; B62D 55/07; B62D 55/08; B62D 55/10; B62D 55/104; B62D 55/24; B62D 55/30; B62M 27/02
USPC ....... 305/120, 124, 127, 128, 129, 130, 131, 305/132, 134, 139, 142; 180/9.1, 9.2, 180/9.25, 9.5, 9.52; 280/5.22
See application file for complete search history.

(56) References Cited

U.S. PATENT DOCUMENTS

| | | | | |
|---|---|---|---|---|
| 2,453,750 A | * | 11/1948 | Kamlookhine | 305/154 |
| 3,068,950 A | * | 12/1962 | Davidson | A61G 5/061 |
| | | | | 180/6.5 |
| 3,840,082 A | * | 10/1974 | Olson | 180/9.5 |
| 3,877,534 A | * | 4/1975 | Krause | 180/193 |
| 3,980,351 A | * | 9/1976 | Orr et al. | 305/149 |
| 6,132,287 A | * | 10/2000 | Kuralt et al. | 446/433 |
| 6,971,466 B1 | * | 12/2005 | Lykken | 180/190 |
| 7,600,592 B2 | | 10/2009 | Goldenberg | |
| 7,690,738 B2 | | 4/2010 | Wilt | |
| 8,479,860 B1 | * | 7/2013 | Jorgenson | 180/193 |
| 2006/0213700 A1 | * | 9/2006 | Hildebrand | 180/9.1 |
| 2011/0037311 A1 | | 2/2011 | Stolkin | |

FOREIGN PATENT DOCUMENTS

JP   6-219341   * 9/1994

* cited by examiner

*Primary Examiner* — S. Joseph Morano
*Assistant Examiner* — Jean Charleston

(57) ABSTRACT

The present application discloses a track support that includes a variable track frame comprising that includes four or more connector members, hinge joints that connect the connector members and configured to form a polygonal shape having sides each associated with one of the connector members, and a track varying mechanism that can actively change an angle between at least two of the connector members so as to change the polygonal shape of the variable track frame. Track engaging wheels mounted on the connector members can rotate around an axis that intercepts with or is adjacent to the hinge joints. The track engaging wheels can engage with a track belt wrapped around the track engaging wheels.

12 Claims, 15 Drawing Sheets

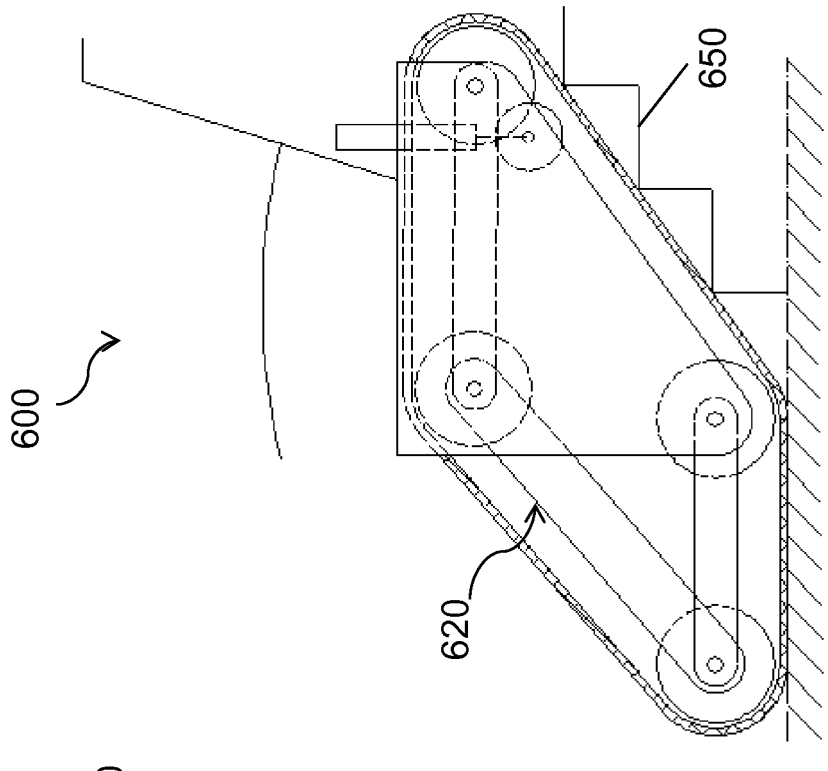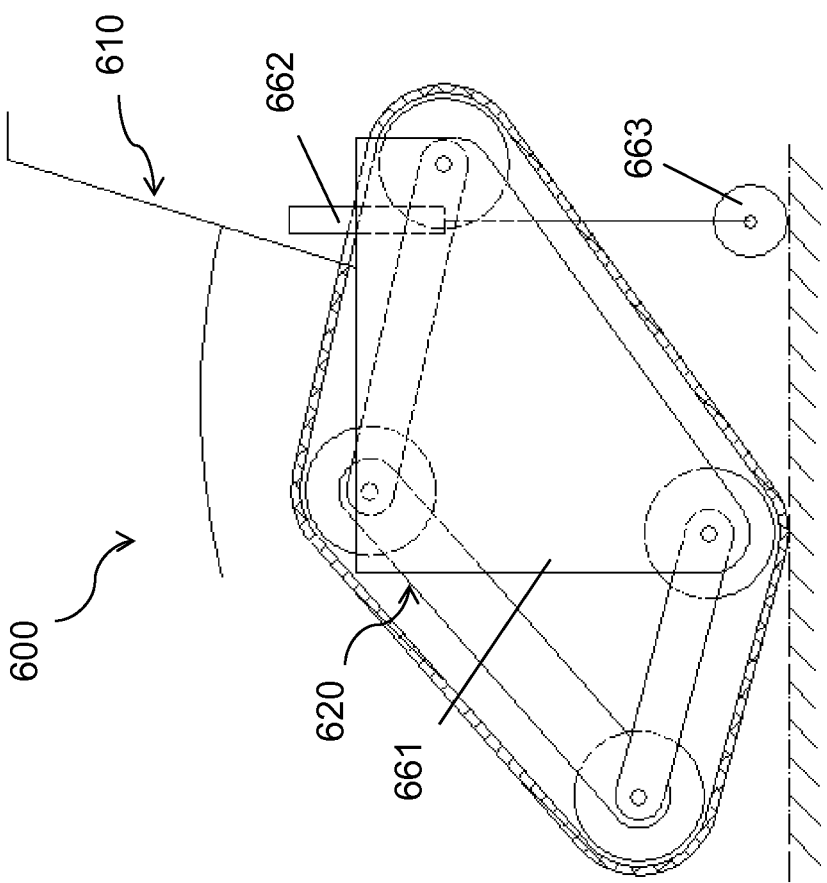

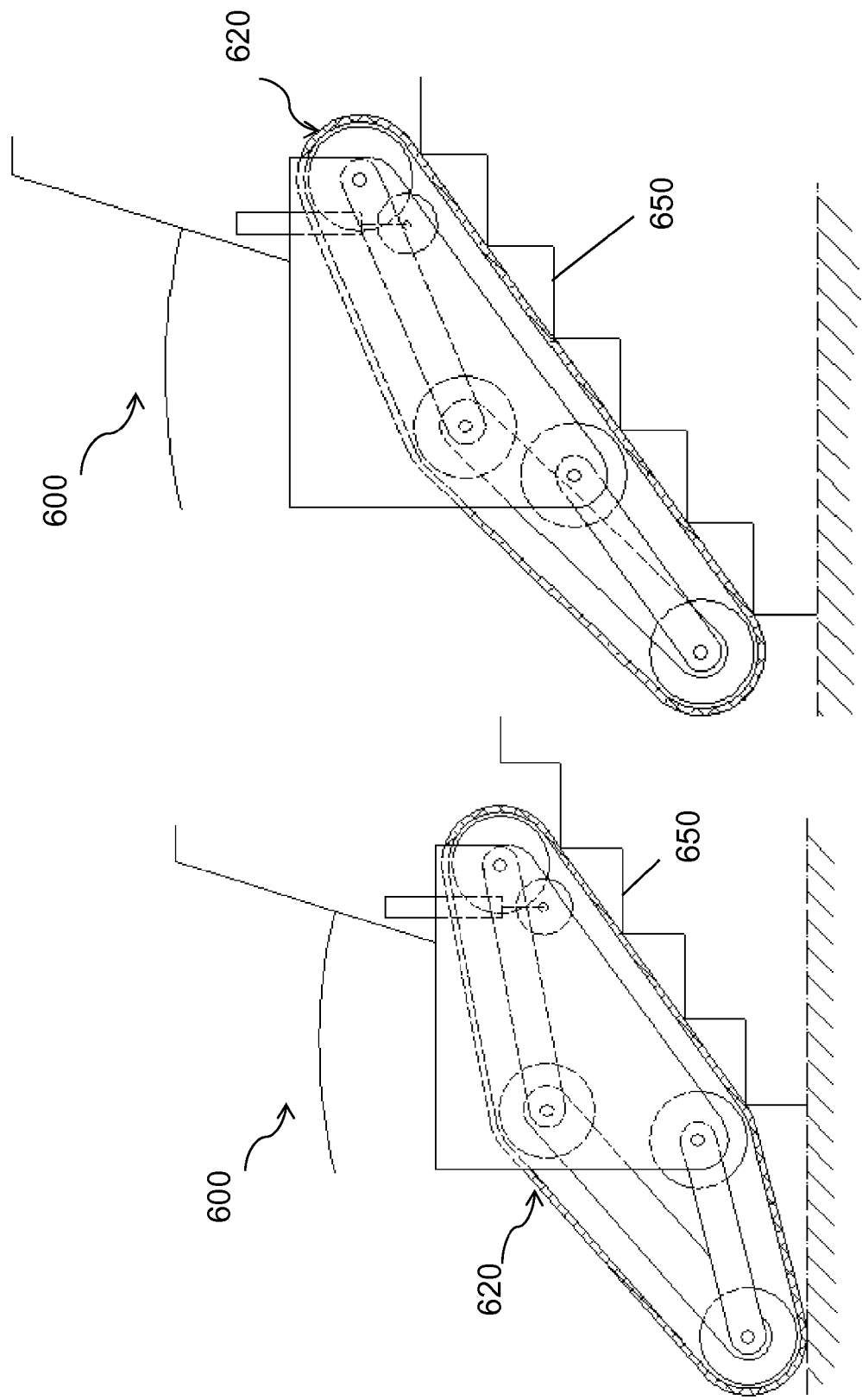

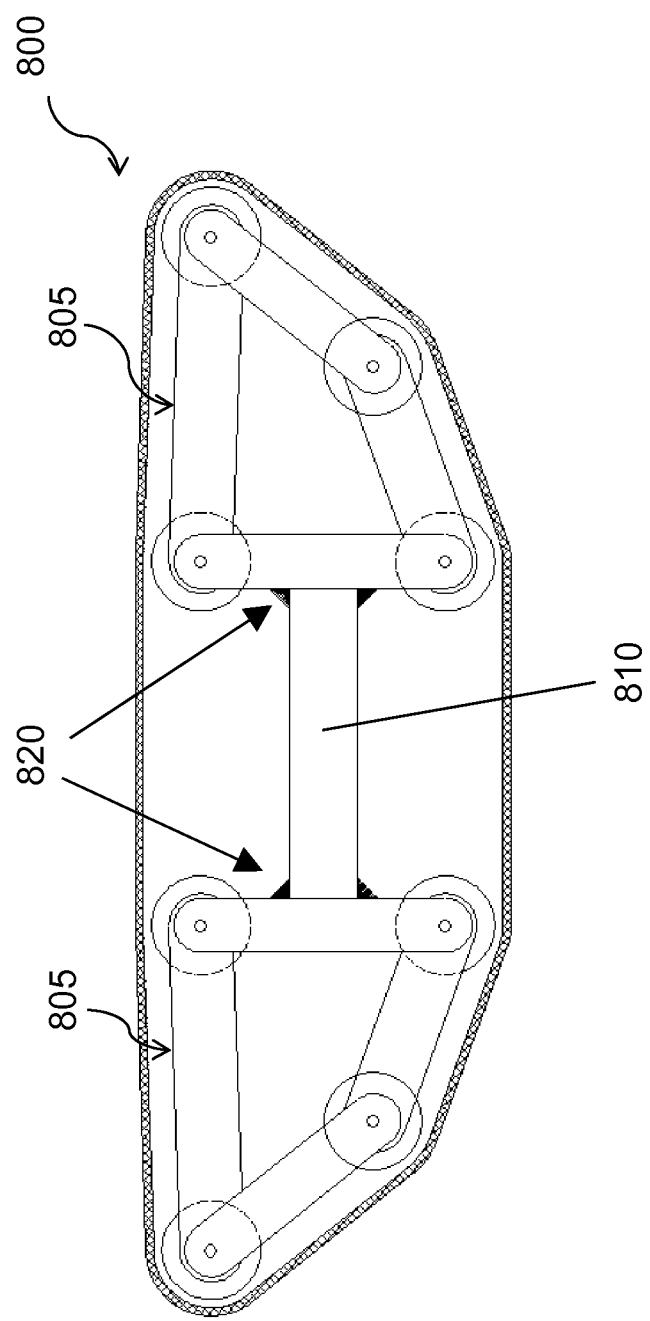

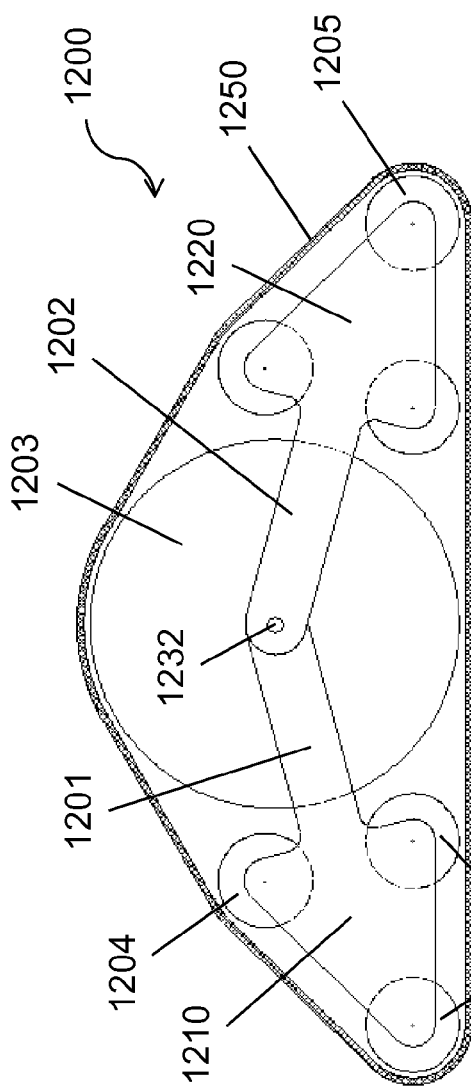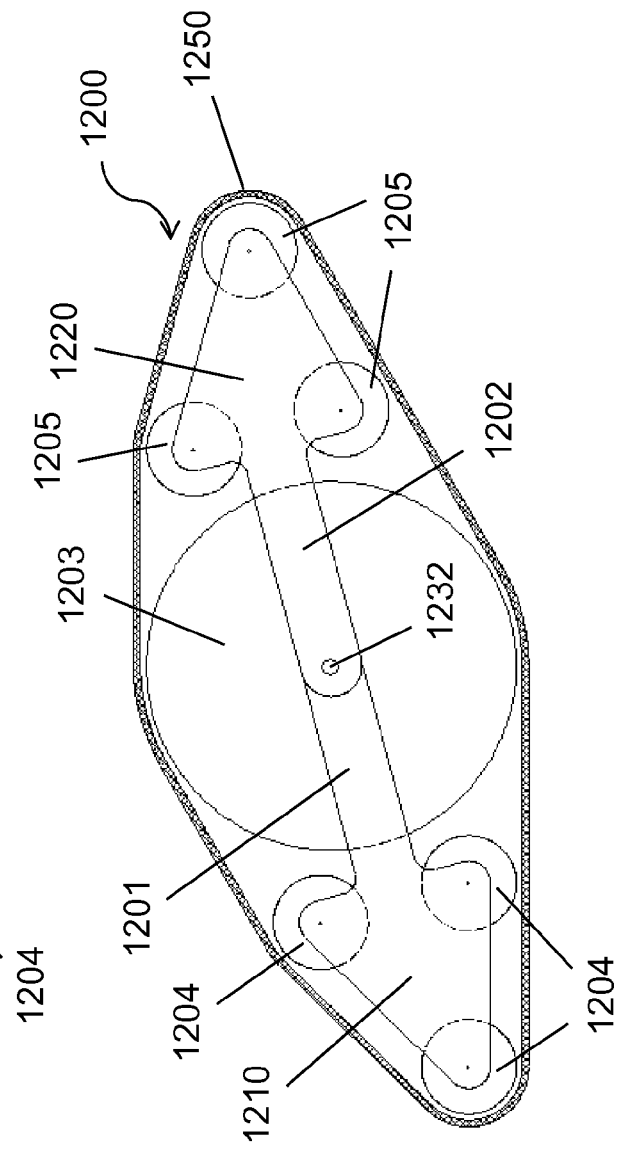
Figure 12A
Figure 12B

DEFORMABLE TRACK SUPPORT FOR TRACKED VEHICLES

BACKGROUND OF THE INVENTION

The present application relates to tracked vehicles, and in particular, to track supports having changeable shapes and configurations.

Variable tracked vehicles can adjust track profiles in order to travel over barriers, staircases, and rough and soft terrains. Conventional variable tracked vehicles include two or more segments and dual tracks with changed positions between the two tracks, but the outlines of the tracks are not changeable. The large number of degrees of freedoms makes this type of variable tracked vehicles difficult to control and maneuver; their applications are limited.

U.S. patents and publications No. U.S. Pat. No. 7,690,738, US2011/0037311, and U.S. Pat. No. 7,600,592 respectively disclose track support mechanisms that can change track outlines in tracked vehicles.

U.S. Pat. No. 7,690,738 teaches a track support having a front and a rear rotatable arms. The track outer profile can be changed by adjusting the angular position of the two rotatable arms. When the two arms are rotated, the circumference of the track support, i.e. the length of the tightest possible belt wrapped around all the track engaging wheels of the track support are changeable. Thus the track belt must either be elastic, or can be loosened or tightened as the two arms rotate. This type of tack mechanism may therefore require a third mechanism for adjusting track tension, in addition to the two mechanisms for adjusting the arms. In the disclosed mechanism, the adjustable arms are implemented as hydraulic cylinders to maintain consistent tension in the tracks.

US2011/0037311 also teaches a track support having two arms with adjustable angles. The track outer profiles all have a trapezoidal shape, and a constant circumference.

U.S. Pat. No. 7,600,592 teaches a track support having a single rotatable arm. The track profile is changed by adjusting the angle of the rotatable arm. The circumference of the track support changes when the arm is rotated. This track support also needs to include a mechanism for adjusting the tension of the track at different configurations.

The above describe outline-variable track supports have limited configurations. Moreover, these outline-variable track supports have large turning radius and thus are harder to maneuver. The track supports also easily damage road surfaces.

There is therefore a need for a simple and a more effective variable track support without the above described drawbacks.

SUMMARY OF THE INVENTION

The present application provides variable track supports that are simpler and easier to control than conventional track supports. The disclosed variable track supports can realize more variety of track profiles, which enhances tracked vehicles' capabilities to overcoming barriers, negotiating difficult terrains, and climbing hills and stairs. In particular, the disclosed track supports can minimize the contact area of the track belt with the ground surface and thus can reduce damage to road surfaces.

In one general aspect, the present invention relates to a track support that includes a variable track frame comprising: N connector members, wherein N is an integer equal to or larger than 4; N hinge joints that connect the N connector members and can form a polygonal shape having N sides each associated with one of the N connector members; and a track varying mechanism that can actively change an angle between at least two of the N connector members so as to change the polygonal shape of the variable track frame. The track support also includes N track engaging wheels mounted on the connector members. The N track engaging wheels each can rotate around an axis that intercepts with or is adjacent to the N hinge joints. The N track engaging wheels can be engaged with a track belt wrapped around the N track engaging wheels.

Implementations of the system may include one or more of the following. The variable track frame can keep the track belt at substantially a same length as the polygonal shape of the variable track frame is changed. The variable track frame can keep the track belt at substantially a same tension as the polygonal shape of the variable track frame is changed. The track varying mechanism can include an adjustable cylinder hinged to the two of the N connector members, wherein the length of the telescopic cylinder is controllable. The adjustable cylinder can include a hydraulic cylinder, pneumatic cylinder, an electric cylinder, or a ball screw. The track varying mechanism can actively change the angle between at least two of the N connector members that are joined by a hinge joint. An angle between at least two of the N connector members can be fixed. The track support can further include a rigid connector connected to two of the N connector members via hinge joints. The track support can further include a tension adjustment mechanism configured to maintain a predetermined tension in the track belt. The tension adjustment mechanism can include a spring loaded track engaging wheel configured to press against the track belt to provide tension to the track belt. At least one of the N connector members can include an adjustable cylinder configured to adjust a length of the one of the N connector members. The track support can further include stability track engaging wheel configured to press the track belt between the N track engaging wheels. The track support can further include a pair of stability track wheels connected to the variable track frame via hinge joints, wherein the pair of stability track wheels can press against the track belt between the N track wheels.

In another aspect, the present invention relates to a track support that includes a first track frame mounted with one or more first track engaging wheels; a second track frame that includes a plurality of 4 or more connector members; a plurality of 4 or more hinge joints that connect the plurality of 4 or more connector members to form a polygonal shape having a plurality of sides each associated with one of the plurality of 4 or more connector members; a track varying mechanism configured to actively change an angle between at least two of the plurality of 4 or more connector members to change the polygonal shape of the first variable track frame or the second variable track frame; and a plurality of 4 or more second track engaging wheels mounted around or adjacent to the plurality of 4 or more hinge joints; and a connector that connects the first track frame and the second track frame. The first track engaging wheels and the second track engaging wheels can be wrapped around by and engaged with a track belt.

Implementations of the system may include one or more of the following. The connector can rigidly connect the first track frame and the second track frame. The connector can connect the first track frame and the second track frame via one or more hinge joints.

In another aspect, the present invention relates to a variable track support that includes a first connector; a first track engaging wheel mounted on the first connector; a second connector connected to first connector via a first hinge joint, wherein the angle between the first connector and the second connector is adjustable by a track varying mechanism; a first sub-mechanism comprising a second track engaging wheel and connected to the first connector; and a second sub-mechanism that can include a third track engaging wheel and connected to the second connector, wherein the first track engaging wheel has a larger diameter than the second track engaging wheel and the third track engaging wheel. Two sides of the first track engaging wheel, the second track engaging wheel, and the third track engaging wheel can be wrapped around by and engaged with a track belt.

Implementations of the system may include one or more of the following. The first hinge joint between the first connector and the second connector can be positioned at the axis of the first track engaging wheel. The first sub-mechanism can include a plurality of second track engaging wheels each of which is configured to engage the track belt. The second sub-mechanism can include a plurality of third track engaging wheels each of which is configured to engage the track belt. The first sub-mechanism can be rigidly connected to the first connector. The second sub-mechanism can be rigidly connected to the second connector. The first sub-mechanism can be connected to the first connector via a second hinge joint. The second sub-mechanism can be connected to the second connector via a second hinge joint.

These and other aspects, their implementations and other features are described in detail in the drawings, the description and the claims.

BRIEF DESCRIPTION OF THE DRAWINGS

FIG. 6A illustrates a wheel chair having a pair of track supports having variable quadrilateral frames as shown in FIG. 1A.

FIGS. 6B-6D illustrate different steps when the wheel chair of FIG. 6A climbs on stairs.

FIG. 8 illustrates another track support comprising two rigidly connected variable quadrilateral track frames in accordance to an embodiment of the present invention.

FIGS. 12A and 12B illustrate a track support having a variable track shape in accordance to another embodiment of the present invention.

DETAILED DESCRIPTION OF THE INVENTION

In some embodiments, the present application discloses a track support that includes four or more rigid connector members which are connected with hinge joints to form a closed loop. Track engaging wheels are mounted around or near each hinge joint to support a track belt. Some angles between pairs of the connector members are adjustable by a mechanism, which allows the track frame to change shape.

Figure 1A:
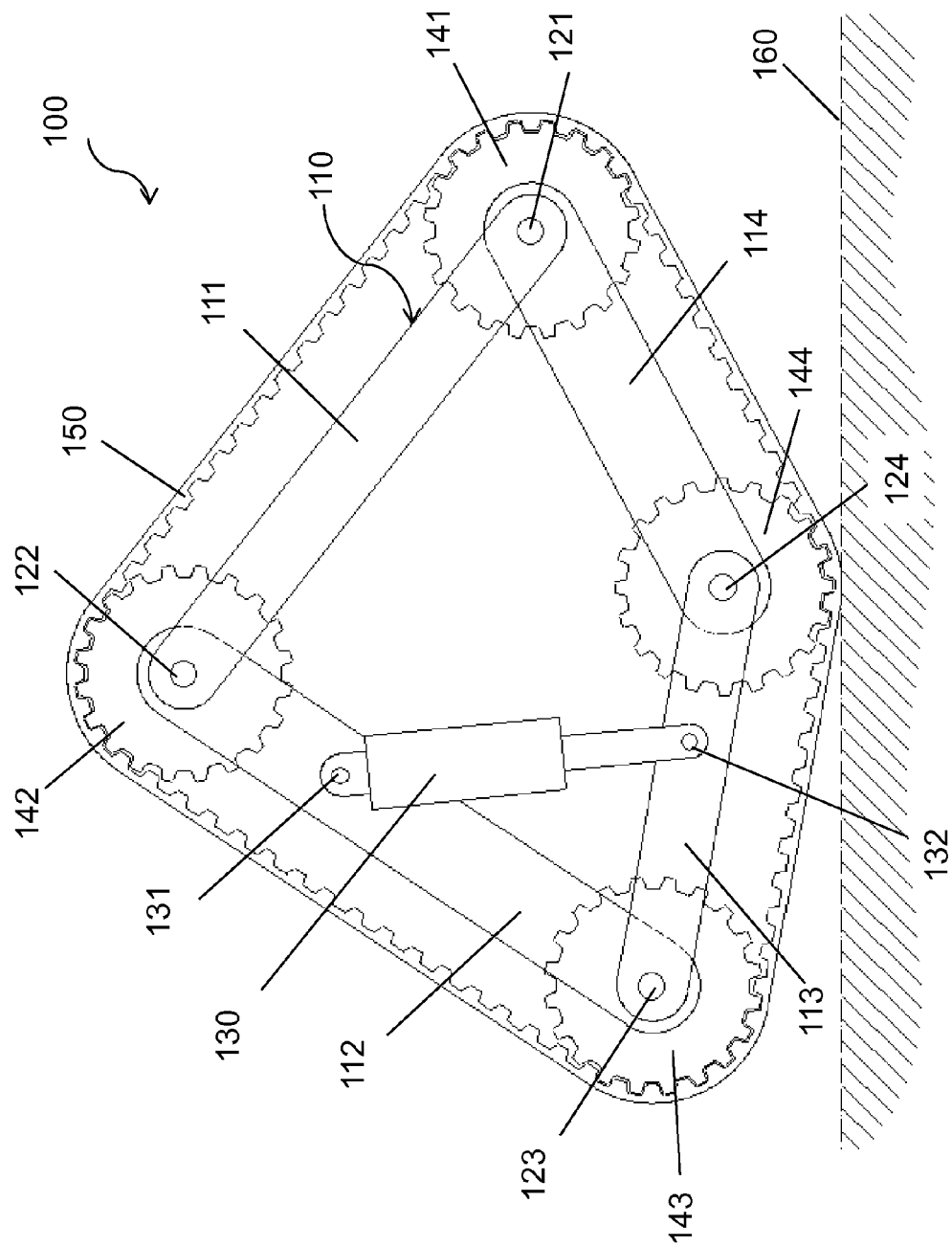
FIGS. 1A-1B illustrate different configurations of a track support having a variable quadrilateral track frame in accordance to an embodiment of the present invention.
Figure 1B:
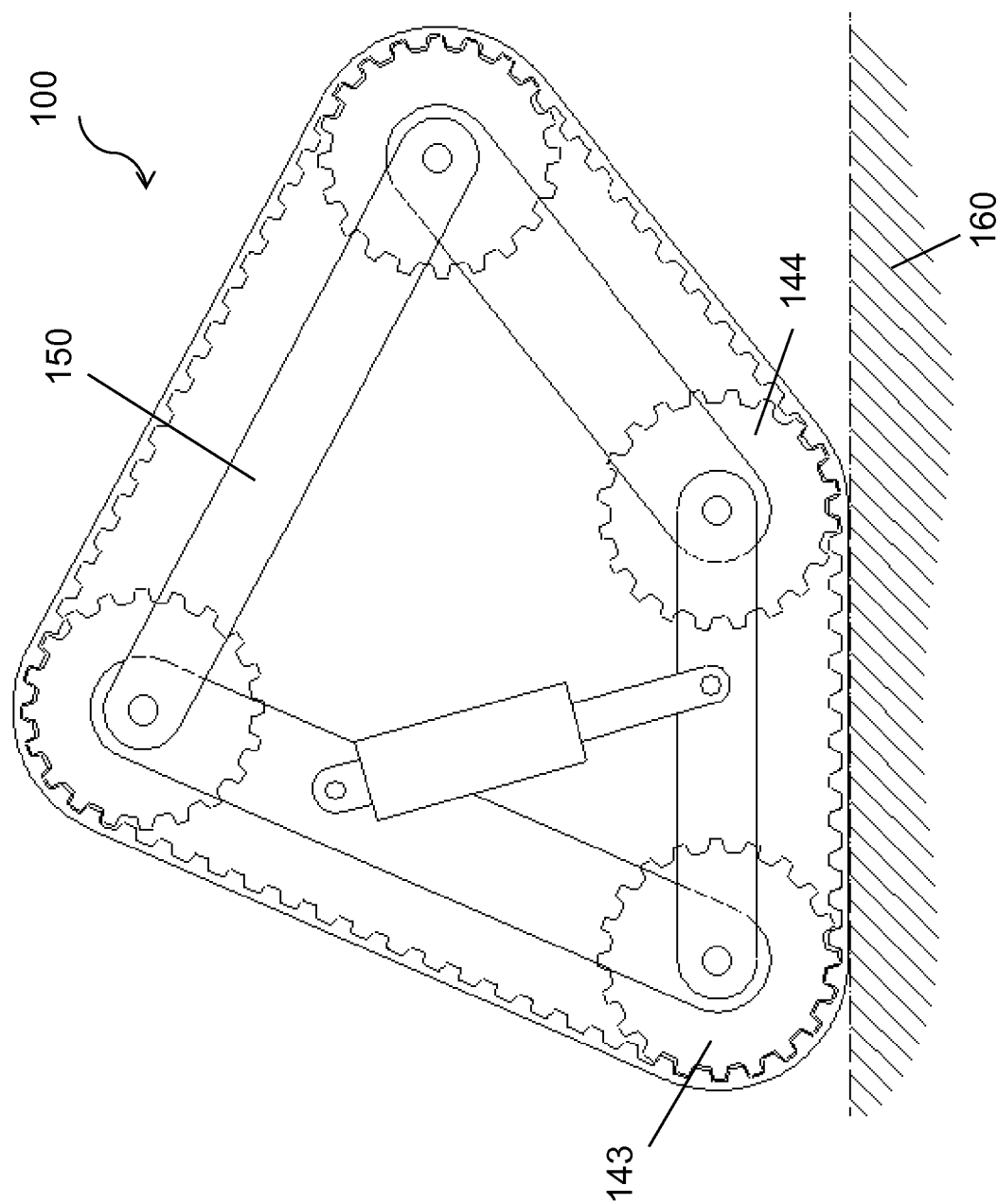

In one implementation, referring to FIGS. 1A-1B, a track support 100 includes connector members 111-114 which are connected by hinge joints 121-124 to form a quadrilateral track frame 110. The shape of the quadrilateral track frame 110 can be varied by a track varying mechanism. The track varying mechanism for example can include an adjustable cylinder 130 that is connected respectively to the connector members 112 and 113 by hinge joints 131, 132. The adjustable cylinder 130 can be implemented by hydraulic, pneumatic, or electric cylinders, or a ball screw mechanism. The adjustable cylinder 130 is externally controlled to vary its shape, thus changing the angle between the connector members 112 and 113 and thus the shape of the quadrilateral track frame 110. The other internal angles in the quadrilateral track frame 110 are not actively changed; they only passively follow the angle between the connector members 112 and 113. Thus the track support 100 only includes a single degree of freedom, which is much simpler than some conventional track supports.

Track engaging wheels 141-144 are respectively mounted around or near the hinge joints 121-124. A track belt 150 is mounted on the track engaging wheels 141-144 for traveling on a surface 160. The track engaging wheels 141-144 have substantially equal diameters, and are concentric or nearly concentric with their respective hinge joints 121-124. The track belt 150 can maintain substantially constant length and thus optimal tension, when the shape of the quadrilateral track frame 110 is varied by the adjustable cylinder 130. Thus, the track support 100 does not need a mechanism for adjusting the tension of the track belt 150, which provides another simplified feature than some conventional track supports.

FIG. 1A shows a configuration of the track support 100 in which the track engaging wheel 144 pivotally touches the surface 160, which reduces friction during movement since the contact area of the track belt with ground surface is minimized. FIG. 1B shows another configuration of the track support 100 in which the track engaging wheels 143, 144 and the portion of the track belt 150 in between touch the surface 160, which increases the contact area with the surface 160 and lowers the weight load at each of the track engaging wheels 143, 144. In comparison, the configuration of the track support 100 shown in FIG. 1A is easier to maneuver than that in FIG. 1B.

Figure 1D:
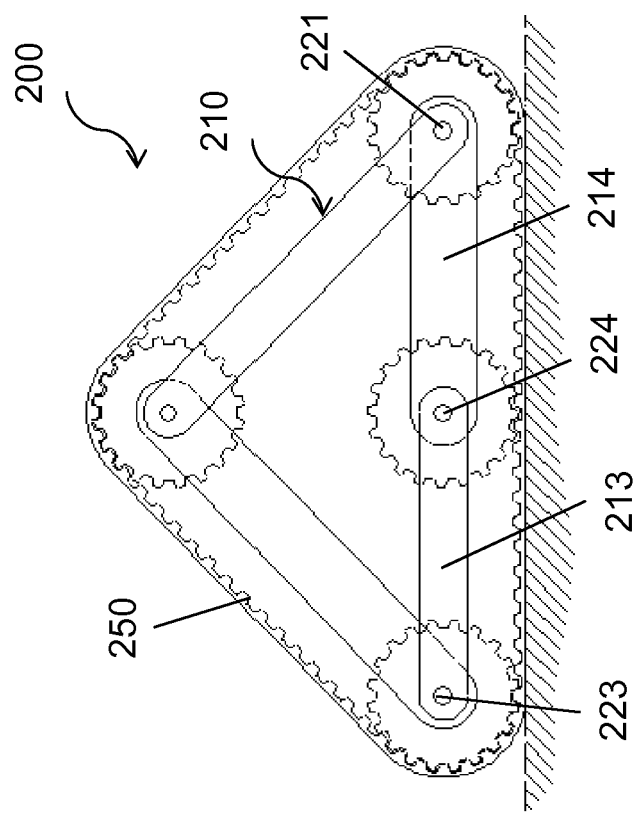
FIGS. 1C-1D illustrate different configurations of another track support having a variable quadrilateral track frame in accordance to an embodiment of the present invention.
Figure 1C:
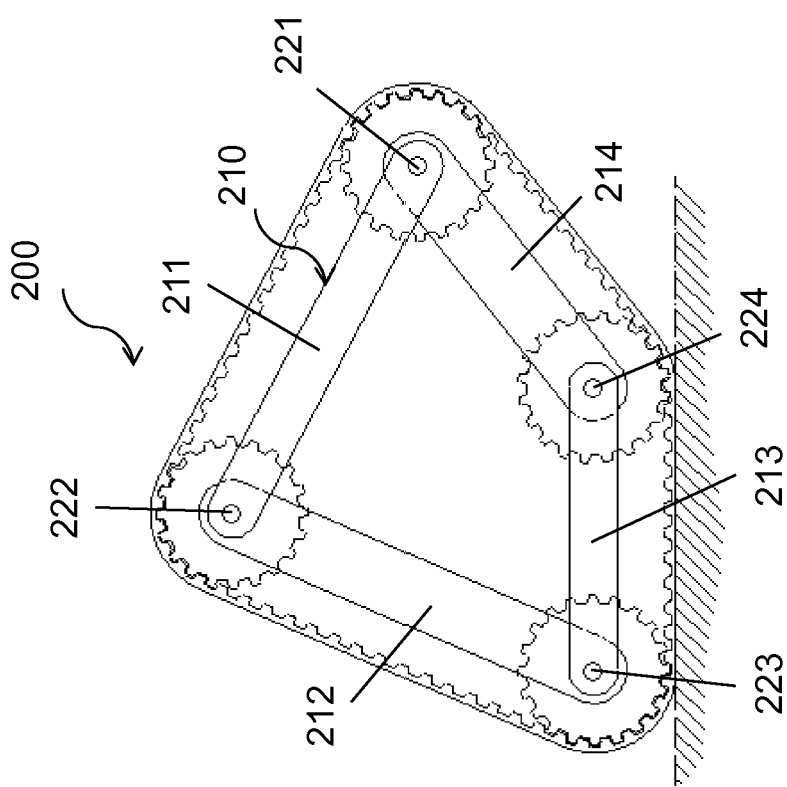

In another implementation, referring to FIGS. 1C-1D, a track support 200 includes a variable quadrilateral track frame 210 formed by connector members 211-214 which are connected by hinge joints 221-224. At least one of the hinge joints 221-224 can be actively rotated and set at different angles by a track varying mechanism (not shown). The track varying mechanism can be implemented by belt, chain, or gear meshing transmission mechanisms. The length and the tension of track belt 250 can be maintained substantially constant in different configurations.

Figure 2:
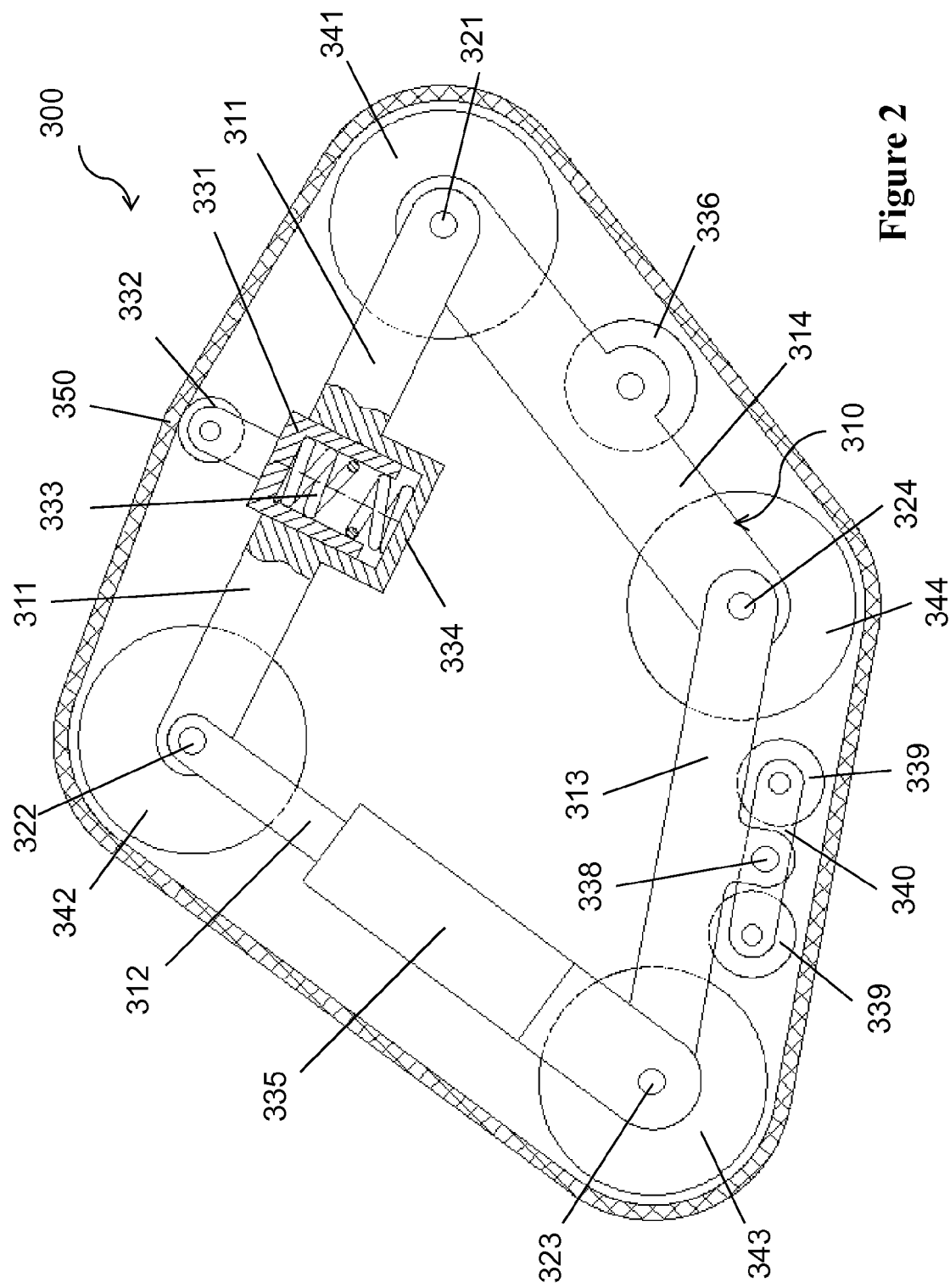
FIG. 2 illustrates another track support having a variable quadrilateral track frame similar to the track support in FIG. 1A.
Figure 3B:
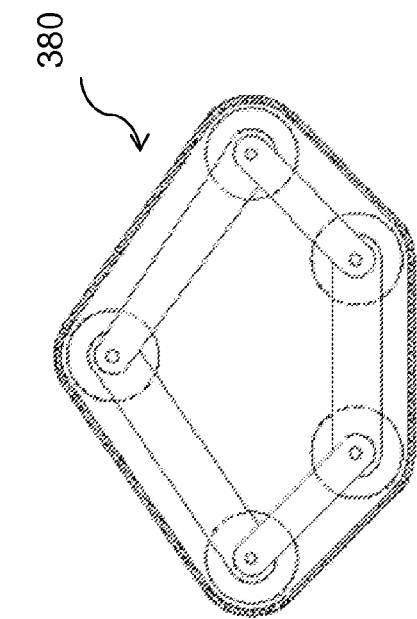
FIGS. 3A-3D illustrate different configurations of a track support having a variable pentagonal track frame in accordance to an embodiment of the present invention.
Figure 3D:
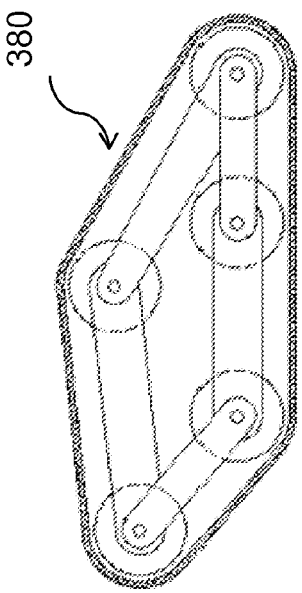
Figure 3A:
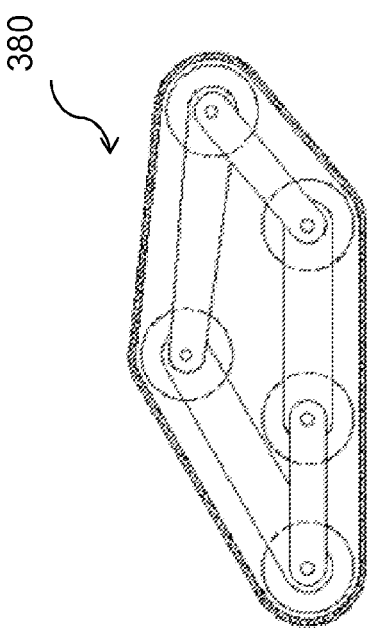
Figure 3C:
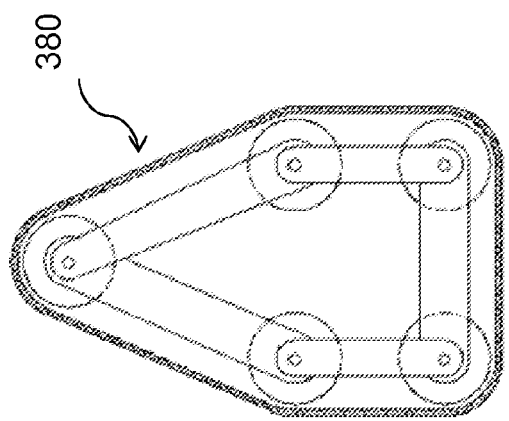

In the above described track supports 100, 200 shown in FIGS. 1A-1D, the track belt 150, 250 can encounter variations in lengths or tensions if the track engaging wheels have different diameters or if the track engaging wheels are not concentric with the joint hinges. FIG. 2 illustrates a track support 300 that can compensate for these variations. A quadrilateral track frame 310 is formed by connector members 311-314 which are connected by joint hinges 321-324. Main track engaging wheels 341-344 are respectively mounted on the hinge joints 321-324. A piston cylinder 334 is rigidly connected to the connector member 311. A track engaging wheel 332 is mounted at the end of piston 331. A spring 333 in the piston cylinder 334 pushes the piston 331 and the track engaging wheel 332 against track belt 350, which automatically adjusts the tension in the track belt 350. A stability track engaging wheel 336 is mounted on the connector member 314 to support the track belt 350 and even out load in the associated segment of the track belt 350. In some embodiments, the connector member 312 is mounted in an adjustable cylinder 335 which is configured to change and rigidly hold the distance between the hinge joints, thus provide adjustment to the tension of the track belt 350. The adjustable cylinder 335 can be implemented by hydraulic, pneumatic, or electric cylinders, or a ball screw mechanism. In addition, a pair of stability track engaging wheels 339 are mounted on a rotatable arm 340 that is hinged to the connector member 313 at a hinge joint 338. During vehicle movement, the stability track engaging wheels 339 can vibrate in response to uneven road surfaces to more uniformly distribute loads to different track engaging wheels 341-344. The shape of the quadrilateral track frame 310 can be changed by a track varying mechanism similar to that described in FIG. 1C-1D.

While the track supports 100-300 are described above to include variable quadrilateral track frames, the present invention is suitable for variable polygonal track frames with N sides respectively formed by N connector members (N is an integer equal to or larger than 4). The N connector members are connected by N hinge joints. N track engaging wheels are mounted on the hinge joints to support a track belt around all the track engaging wheels. One or more angles between pairs of connector members can be actively changed while angles between other pairs of connector members passively respond to the change in the shape of the variable polygonal track frame. At least one of the track engaging wheels may be actively driven during movement of the vehicle. The length of and the tension in the track belt can stay substantially when the variable polygonal track frame changes shape. In some embodiments, a tension adjusting mechanism can be installed to maintain an optimal tension in the track belt.

Figure 4B:
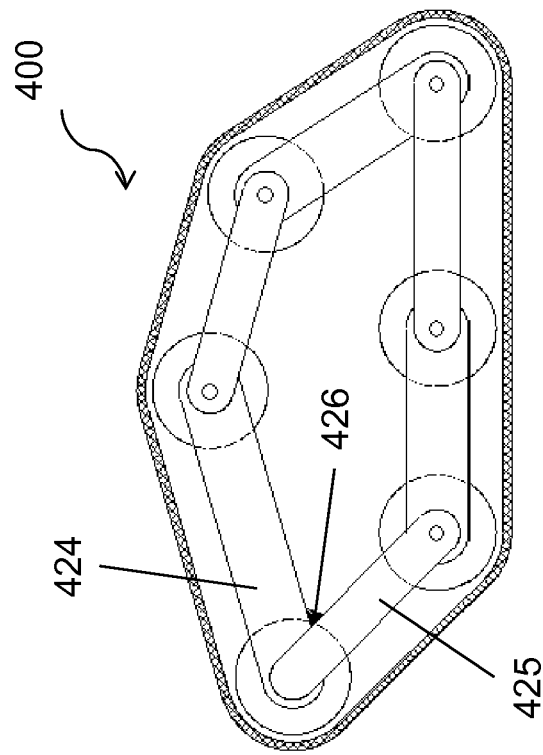
FIGS. 4A-4B illustrate different configurations of a track support having a variable hexagonal track frame in accordance to an embodiment of the present invention.
Figure 4A:
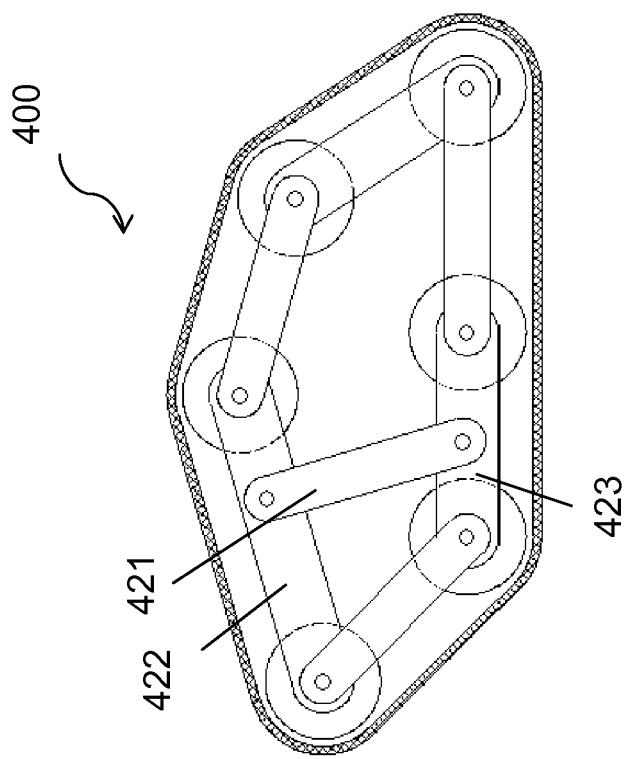
Figure 5C:
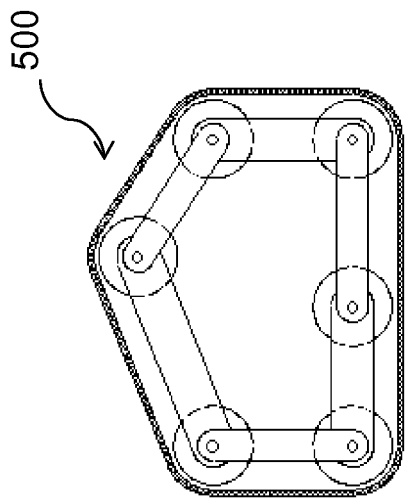
FIGS. 5A-5F illustrate configurations of a track support having a variable hexagonal track frame in accordance to an embodiment of the present invention.
Figure 5B:
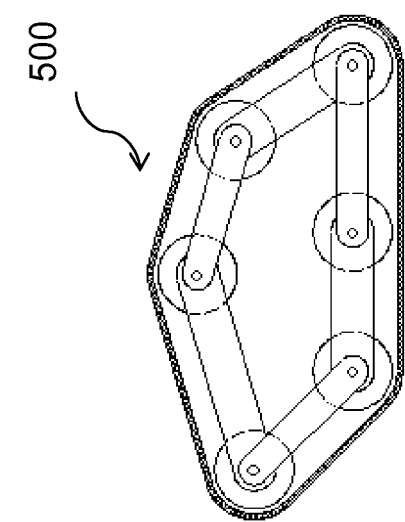
Figure 5A:
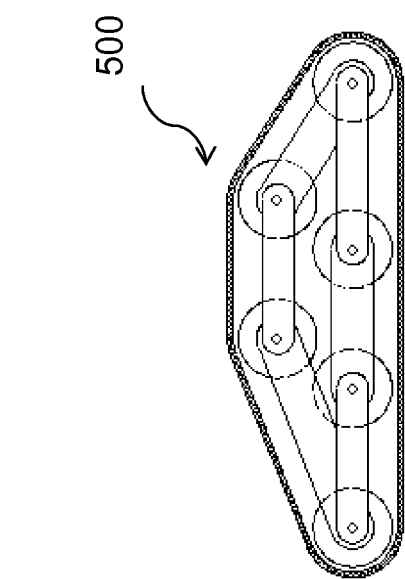
Figure 5F:
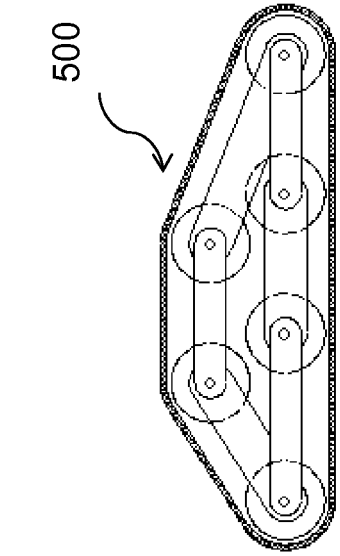
Figure 5E:
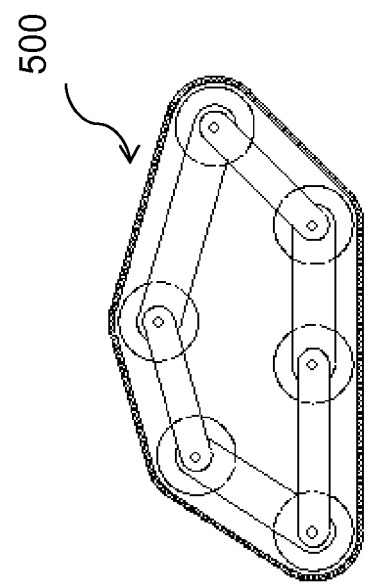
Figure 5D:
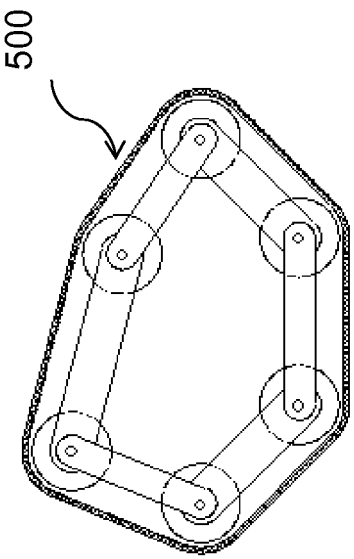

FIGS. 3A-3D illustrate different configurations of a track support 380 having a variable pentagonal track frame. FIGS. 4A-4B illustrate different configurations of a track support 400 having a variable hexagonal track frame. The large number of adjustable degrees of freedom in a variable hexagonal track frame can be reduced. For example, in FIG. 4A, a connector can be connected to connector members 422, 423 via hinge joints to keep the distance between a pair of points on the respective connector members 422 and 423 the same at all times. In FIG. 4B, the angle between connector members 424, 425 is fixed, for example by welding the corner 426.

FIGS. 5A-5F illustrate configurations of a track support 500 having a variable hexagonal track frame. It should be noted that due to the large number of variable degrees of freedom, one or more neighboring connector members can be held in a linear fashion in some configurations, as shown in FIGS. 5A-5C, 5E, and 5F. In those configurations, the variable hexagonal track frame is configured in a polygonal shape with fewer than 6 sides (e.g. 5, 4, or 3 sides). In the present disclosure, a variable N polygonal track frame is capable of providing an N-sided polygon track frame shape, as well as, polygonal shapes fewer than N sides.

The above described track supports can be used in many types of vehicles, including wheel chairs. FIG. 6A illustrates an exemplified wheel chair 600 having a chair 610 mounted on a pair of track supports on each side of the driver. A track support 620 on the left side of the driver, shown in FIGS. 1C and 1D, comprises a variable quadrilateral frame. The track support on the right (not shown) is a mirror image of the track support 620. A track belt is wrapped around each track support. The chair 610 is mounted on a chair frame 661 which rigidly connects a connector member of the track support 620 and a corresponding connector member (not shown) of the track support on the left side of driver. To provide balance to the wheel chair 600, a wheel 663 is mounted on the chair frame 661 via a telescopic cylinder 662.

FIGS. 6B-6D illustrate different steps when the wheelchair 600 climbs on stairs 650. The variable track support 620 adaptively changes shape when the track belt comes to contact with the different number of steps in the stairs 650. A more elongated shape in the variable track support 620 ensures more steps in the stairs 650 are contacted to provide stability and to distribute weight loads.

Figure 7A:
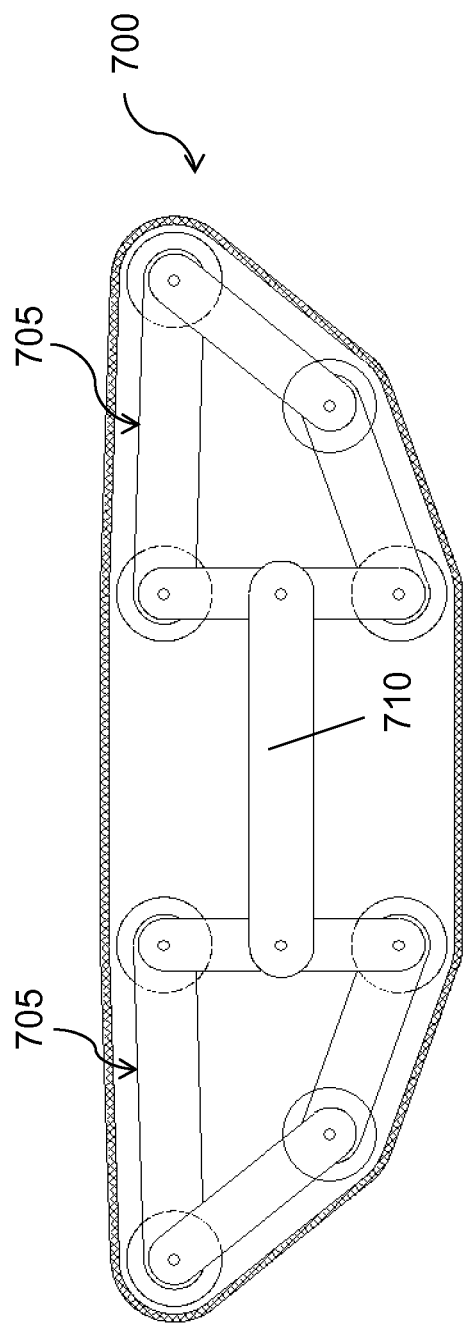
FIGS. 7A-7B illustrate a track support comprising two flexibly connected variable quadrilateral track frames in accordance to an embodiment of the present invention.
Figure 7B:
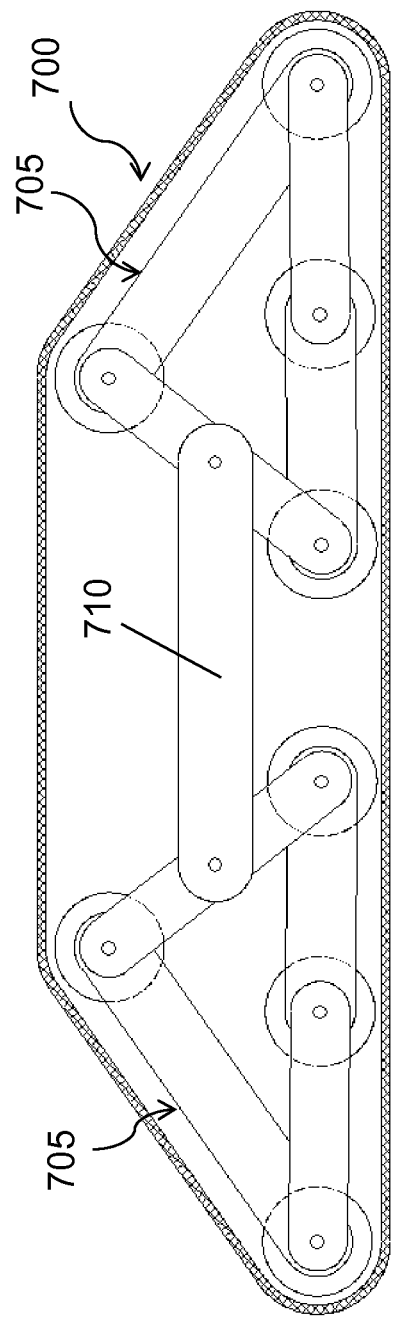

In some embodiments, two or more variable track frames can be linked to support a single track belt in a track support. Referring to FIGS. 7A-7B, a track support 700 includes two variable track frames 705 connected by a connector 710 via two hinge joints. The variable track frames 705 can change shapes to provide smaller contact area (FIG. 7A) or larger contact area (FIG. 7B). FIG. 8 illustrates another exemplified track support 800 that include two variable track frames 805 that are rigidly connected to a connector 810 by welding the corners 820.

Figure 9:
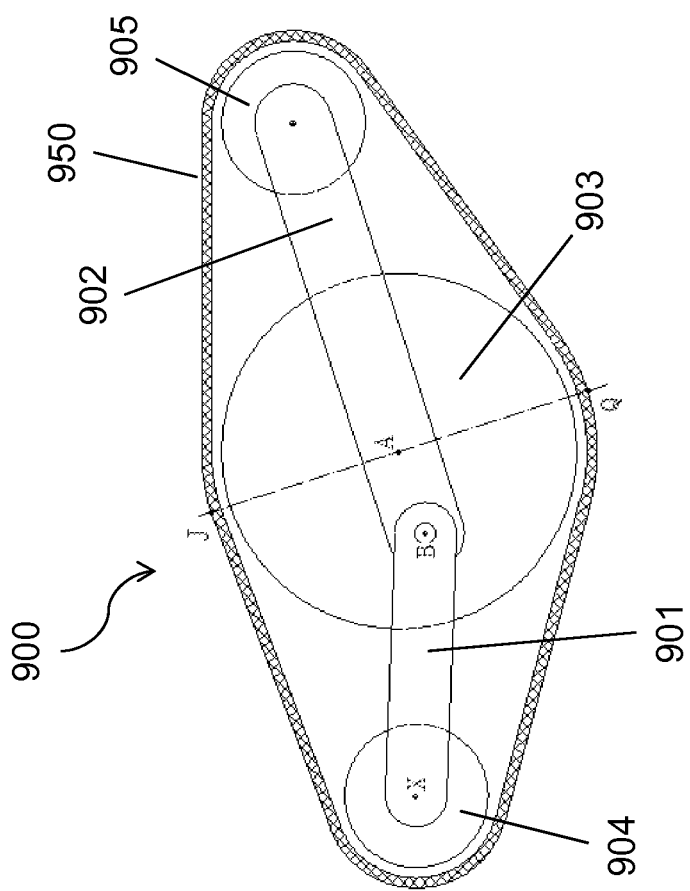
FIG. 9 illustrates a track support having a variable quadrilateral track shape in accordance to another embodiment of the present invention.

FIG. 9 illustrates a track support 900 that is formed by connectors 901, 902 that connect a large track engaging wheel 903 at the center with two smaller track engaging wheels 904, 905 at the two ends. A track belt 950 wraps around the track engaging wheel 904, 905 and two sides of the track engaging wheel 903 to form an envelope. The connectors 901, 902 are hinged around an axis B which may be the same as or somewhat different from axis A of the large track engaging wheel 903. Axes A and B are perpendicular to the viewing direction in FIG. 9. The angle between the connectors 901, 902 at axis B is adjusted by a track varying mechanism (not shown). If axis B coincides with axis A, then the circumference of the tightest belt wrapped on the track support stays constant when connector 901 is continuously rotated relative to connector 902 around axis B (which is the same as A). Moreover, given a pair of points J and Q on the arcs of the wheel 903 that touch the track belt, the length of either track belt segment from point J to point Q stays constant as well. Thus, the track belt may be driven by the track engaging wheel 903 from two sides without having to cause slippery on either side. However, if axis B is different from axis A, then the circumference of the tightest track belt wrapped around the track support is changeable when connector 901 is rotated relative to connector 902 around axis B. In this case, the tension in the track belt 950 changes as the angle between the connectors 901 and 902 at axis B is adjusted.

Figure 10:
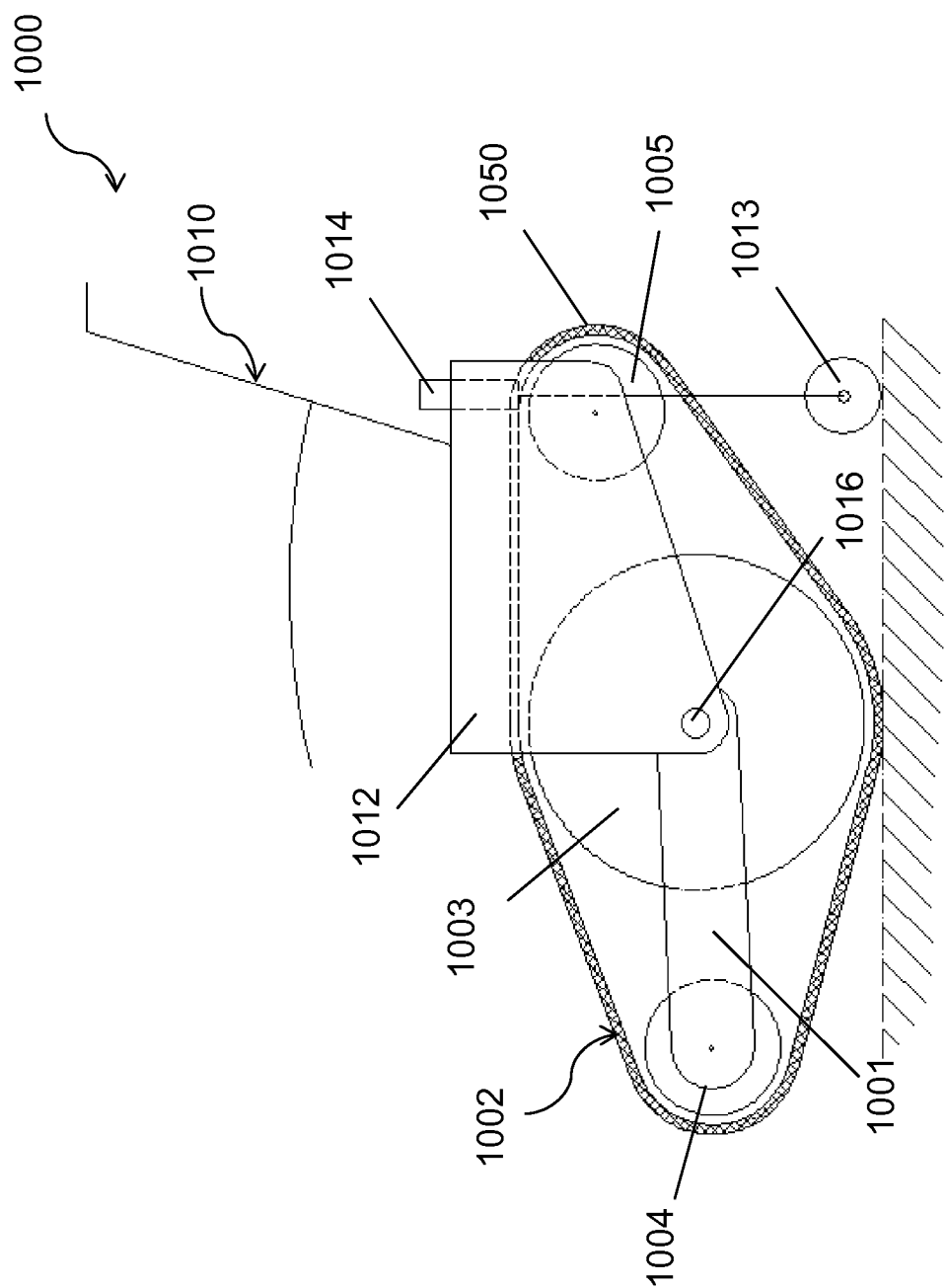
FIG. 10 illustrates a wheel chair having a pair of track supports as shown in FIG. 9.

FIG. 10 illustrates a wheel chair 1000 having a track support 1002 on the left side of driver, similar to the track support 900 as shown in FIG. 9 with the axis B coinciding with the axis A. Another track support on the right side of driver is not shown. A chair 1010 is fixedly connected to an expanded chair frame 1012 which also plays the role of connector 902 in FIG. 9 for both track supports. Thus, a large track engaging wheel 1003 and a small track engaging wheel 1005 are mounted on the expanded chair frame 1012. A connector 1001 supports another track engaging wheel 1004 at one end, and is hinged to a shaft 1016 whose sleeve is rigidly connected with the expanded chair frame 1012 on the other. The shaft 1016 is concentric with the wheel 1003. A track belt 1050 wraps around the track engaging wheels 1004, 1005 and two sides of the track engaging wheel 1003 to form an envelope. The angle between the connector 1001 and the chair frame 1012 around the shaft 1016 can be varied to adjust the contact area of the track belt 1050 with the road surface while the length and tension of the track belt 1050 stay largely unchanged. Same structures are built for a track belt and the track support on the right side of driver. Indeed, the track support on left side of driver as shown in the figure and the track support on right side of driver (not shown in the figure) are exact mirror images of each other. To provide balance to the wheelchair 1000, a wheel 1013 is mounted on the chair frame 1012 via a telescopic cylinder 1014.

Figure 11:
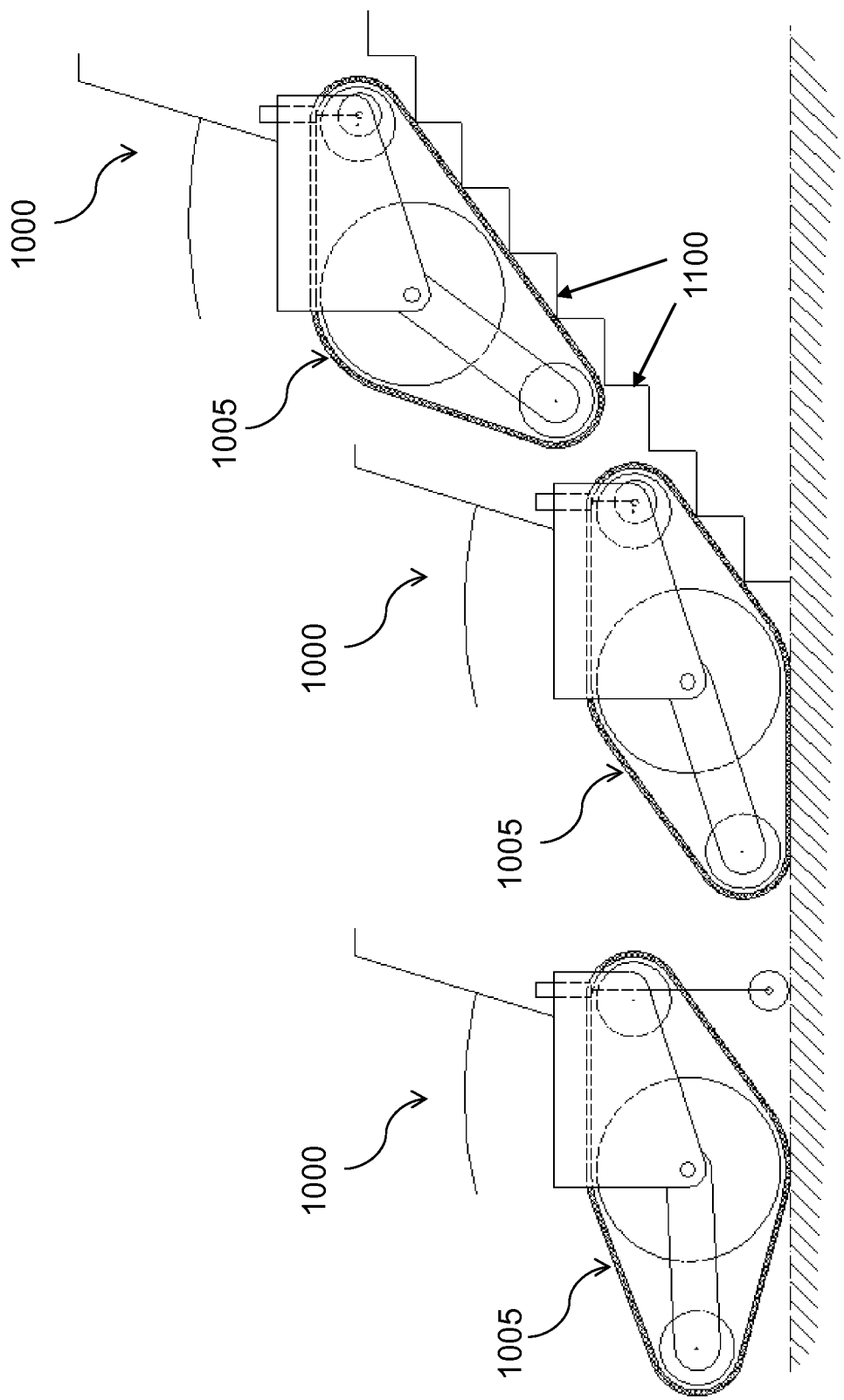
FIG. 11 illustrates steps of stair climbing by the wheel chair shown in FIG. 10.

FIG. 11 illustrates the wheel chair 1000 climbing stairs 1100. As the wheel chair 1000 climbs onto more stair steps, the connector 1001 is rotated downward to allow large contact area between the track belt 1050 and the stair steps 1100 to provide friction, stability, and distribution of weight.

FIGS. 12A and 12B illustrate a track support 1200 comprising two rigid triangular frames 1210 and 1220 that are hinged to the axis 1232 of a large track engaging wheel 1203 by two connectors 1201, 1202. Multiple small track engaging wheels 1204, 1205 can be respectively mounted on each of the triangular frames 1210 and 1220. A track belt 1250 wraps around the small track engaging wheels 1204, 1205 and two sides of the track engaging wheel 1203 to form an envelope. The angle between the two connectors 1201 and 1202 can be adjusted by a track varying mechanism (not shown) to achieve different configurations as shown in FIGS. 12A and 12B.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

It should be noted that the present disclosure is compatible with variable tack frames other than the examples described above. The variable track frames can define track profiles with four, five, size, and other number of sides. The track shape can be changed by mechanisms other than the examples described above. Moreover, the track supports can include wheel chairs, as described above, as well as moveable robots, tractors, construction vehicles, military vehicles, and so on. The track engaging wheels and track belts may be textured or smooth, with or without gears. It should also be noted that the presently disclosed track support and track vehicles can include additional wheels outside of the track mechanism.

What is claimed is:

1. A track support, comprising:
 a variable track frame comprising:
  four rigid connector members arranged in a variable quadrilateral pattern such that each side of the quadrilateral pattern corresponds to a connector member, and each vertex of the quadrilateral pattern corresponds to a pair of connector members; and
  a first mechanism corresponding to each vertex of the quadrilateral pattern, wherein the first mechanism is configured to constrain the relative movement of the corresponding pair of connector members to a rotation around an axis, wherein the said axis is configured to be relatively fixed with respect to each connector member of the said pair; and
  a track engaging wheel corresponding to each vertex of the quadrilateral pattern, wherein the axis of the track engaging wheel is configured to coincide or nearly coincide with the axis of rotation of the corresponding pair of connector members;
  wherein the axes of the track engaging wheels are configured to be parallel to each other;
  a track varying mechanism configured to actively change the relative position of a pair of connector members; and
  a track belt configured to wrap around the four track engaging wheels; and
  a stability track engaging wheel configured to press the track belt.

2. The track support of claim 1, wherein the track engaging wheels are configured to have a same radius.

3. The track support of claim 1, wherein the track belt is configured to be kept at substantially a same tension as the quadrilateral shape formed by the axes of track engaging wheels is changed.

4. The track support of claim 1, wherein the track varying mechanism comprises an adjustable cylinder hinged to the two of the connector members, wherein the length of the adjustable cylinder is controllable.

5. The track support of claim 4, wherein the adjustable cylinder comprises a hydraulic cylinder, pneumatic cylinder, an electric cylinder, or a ball screw.

6. The track support of claim 1, wherein a pair of connector members are joined by a hinge joint, and the tracking varying mechanism is configured to actively change the rotational angle between the pair of connector members around the axis of the hinge joint.

7. The track support of claim 1, wherein an angle between at least two of the N connector members is fixed.

8. The track support of claim 1, wherein a first mechanism comprises a hinge joint.

9. The track support of claim 1, further comprising:
 a tension adjustment mechanism configured to maintain a predetermined tension in the track belt.

10. The track support of claim 9, wherein the tension adjustment mechanism comprises:
 a spring loaded track engaging wheel configured to press against the track belt to provide tension to the track belt.

11. The track support of claim 1, wherein at least one of the N connector members comprises an adjustable cylinder configured to adjust a length of the one of the N connector members.

12. A track support, comprising:
- a variable track frame comprising:
    - four rigid connector members arranged in a variable quadrilateral pattern such that each side of the quadrilateral pattern corresponds to a connector member, and each vertex of the quadrilateral pattern corresponds to a pair of connector members; and
    - a first mechanism corresponding to each vertex of the quadrilateral pattern, wherein the first mechanism is configured to constrain the relative movement of the corresponding pair of connector members to a rotation around an axis, wherein the said axis is configured to be relatively fixed with respect to each connector member of the said pair; and
    - a track engaging wheel corresponding to each vertex of the quadrilateral pattern, wherein the axis of the track engaging wheel is configured to coincide or nearly coincide with the axis of rotation of the corresponding pair of connector members;
    - wherein the axes of the track engaging wheels are configured to be parallel to each other;
    - a track varying mechanism configured to actively change the relative position of a pair of connector members; and
    - a track belt configured to wrap around the four track engaging wheels; and
- a pair of stability track wheels connected to the variable track frame via hinge joints, wherein the pair of stability track wheels are configured to press against the track belt.

* * * * *